United States Patent [19]

Connell

[11] Patent Number: 5,466,273
[45] Date of Patent: Nov. 14, 1995

[54] METHOD OF TREATING ORGANIC MATERIAL

[76] Inventor: Larry V. Connell, 309 N. 84th Ave., Yakima, Wash. 98908

[21] Appl. No.: 234,228

[22] Filed: Apr. 28, 1994

[51] Int. Cl.$^6$ .............................. C05F 3/00; C05F 11/00; C05F 11/02
[52] U.S. Cl. ................... 71/11; 71/12; 71/13; 71/15; 71/21; 71/23; 71/24
[58] Field of Search ..................... 71/11, 12, 13, 71/15, 21, 23

[56] References Cited

U.S. PATENT DOCUMENTS

| | | |
|---|---|---|
| 1,325,787 | 12/1919 | Grossman . |
| 1,430,182 | 9/1922 | Peck . |
| 3,050,383 | 8/1962 | Wilson . |
| 3,108,868 | 10/1963 | Wade . |
| 3,732,089 | 8/1971 | Megronigle . |
| 3,865,568 | 2/1975 | Kratzer . |
| 3,929,446 | 12/1975 | Trocino . |
| 3,942,920 | 3/1976 | Sakamaki . |
| 3,950,562 | 4/1976 | Senior . |
| 3,966,450 | 6/1976 | O'Neill et al. . |
| 3,971,720 | 7/1976 | Swanson et al. . |
| 4,078,094 | 3/1978 | Katzen . |
| 4,201,564 | 5/1980 | Kauzal ......................... 71/15 |
| 4,743,287 | 5/1988 | Robinson . |
| 5,393,317 | 2/1995 | Robinson ..................... 71/12 |

FOREIGN PATENT DOCUMENTS

| | | |
|---|---|---|
| 0428015 | 10/1990 | European Pat. Off. . |
| 0428014 | 10/1990 | European Pat. Off. . |
| WO9116280 | 10/1991 | WIPO . |

OTHER PUBLICATIONS

Acres, U.S.A. Primer, Calcium and Magnesium, pp. 180–185.
Agriculture and Fertilizers Reprint, Tangen Grafiske Senter, Drammen Norway, Oct. 1990.
The Albrecht Papers vol. II, Soil Fertility and Animal Health, pp. iv, 39, 48, 49, 53, 76, 77.
Ammonium Chloride (2 pages).
Brady, Nyle C., The Nature and Properties of Soils, Tenth Edition Macmillan Publishing Co., New York.
Fowles, Dolomite: the mineral that shouldn'3 t exist, New Scientist, pp. 46–47 (26 Oct. 1991).
Kovak Books, pp. 21–22, 48, 51, 52–54, 56, 57.
Lal, R. and Pierce, F. J., The Vanishing Resource, pp. 1–5.
Microbiological Examination (9000), 9230 Fecal Streptococcus and Enterococcus Groups, pp. 9–108.
Prost, J. and Rondelez, F., Structures in colloidal physical chemistry, Supplement To Nature, vol. 350, 18 Apr. 1991, pp. 11–16.
Rateaver, Bargyla, How Large Molecules Are Absorbed By Plants, 1989.
Soil Organic Matter, Handbook, Principal Benefits Of Soil Organic Matter, p. 139.
Water crisis looms for a thirsty world, Washington (AP).
Willis, Harold, Mineral vs. Organic Soils, Apr. 1992.

*Primary Examiner*—Wayne Langel
*Attorney, Agent, or Firm*—Trask, Britt & Rossa

[57] ABSTRACT

A method of treating organic material which includes admixing organic material with water and an acid, the acid equivalent to 5–12% by total weight 100% sulfuric acid; increasing the pH of said admixture, while simultaneously introducing up to 5% by weight of steam; and heating and drying the basified admixture. The resultant material makes excellent plant food, fertilizer, or soil conditioner. Various modifications are possible, e.g., during the first step, steam may be introduced in an amount of up to 40% by weight of the final product. Also, during the first step, carbonate-free calcium may be included in the admixture of the first step. After the alkalinization step, nutrients such as lime, dolomite, rock phosphate, potash, ammonium nitrate, and/or urea may be added to the admixture. The resulting material can be granulated, extruded or pelletized.

12 Claims, No Drawings

METHOD OF TREATING ORGANIC MATERIAL

TECHNICAL FIELD

This invention relates generally to a method of treating organic materials, such as manure, to create a plant food and soil conditioner. More specifically, the invention relates to the sequential treatment of organic materials with an acid and then a base while simultaneously introducing steam into the admixture.

BACKGROUND ART

Man has used organic materials such as manure as fertilizers for years. More recently these organic materials have been pretreated in one fashion or other to create better nutrient balanced, less odoriferous fertilizer compositions.

For example, U.S. Pat. No. 4,743,287 to Robinson (May 10, 1988) discloses a humic acid fertilizer and method of making it. Robinson's method involves the use of a sealed reactor system, wherein organic material, water, and certain inorganic elements are mixed with, for example, an acid, to accomplish hydrolysis and a drastic change in pH, raising both the mix temperature and pressure. The mix is then subsequently mixed with a base, to provide a further temperature and pressure increase. The inorganic elements are added initially so that they may be available for humic acid bonding to the hydrolyzed organic molecules.

As can be determined by scrutinizing Robinson's process, the organic material is dried and composted resulting in a relatively expensive, time-consuming process. Also in Robinson's process, relatively high concentrations of sulfuric acid are used to achieve hydrolysis. For example, EXAMPLE I of Robinson indicates the use of an 8% sulfur content which works out to be 160 pounds (73 kg) of sulfur per acre if one acre is treated with one ton (909 kg) of humic acid fertilizer. This amount of sulfur can become significant if the fertilizer is repeatedly applied on an annual basis. Robinson also reports a maximum of 30% water content in his process which takes place in a closed vessel to prevent the loss of ammonia vapors.

Later work attributed to Robinson is described in European Patent publication numbers 428,014 A2, 428,014 A3, 428,015 A2, and 428,015 A3, published on May 22, 1991.

DISCLOSURE OF THE INVENTION

The invention includes a method of treating organic material which includes the steps of (1) admixing, for a time, the organic material with water and an acid, the acid equivalent to 5 to 12% (by total weight of the end product) 93–100% sulfuric acid; (2) increasing the pH of the admixture, while simultaneously introducing up to 5% by weight of steam; and (3) heating and drying the resulting admixture. The resulting material makes excellent dried plant food, fertilizer, or soil conditioner which has sustained release properties.

The inventive process can be modified somewhat. For example, during the first step, steam may be introduced during the mixing process in an amount sufficient to raise the total moisture content to 45% by weight of the admixture of the first step. (i.e. the acid addition step) Also, during the first step, calcium carbonate such as dolomite may be included in the admixture. If such is included in the first step, some decarbonation of the material will take place.

After the step, in which the pH is increased nutrients may be added to the admixture. Such nutrients include lime, dolomite, rock phosphate, potash, ammonium nitrate, urea, soil clays, vermiculite, forms of commercial nitrogen, and mixtures thereof.

The resulting material can be granulated, extruded or pelletized and dried for ease in storage or administration.

One advantage of the method is that the organic material need not be previously composted before use with the process saving both time and labor. The inventive method acts to decrease the amount of microbial growth in the resulting mixture yielding a better shelf-life.

The invention has the ability to accommodate for the availability of various raw materials locally (e.g. the ability to use composted or non-composted organic materials, the ability to have additions which are needed for a local soil condition), meet the needs of various soil conditions in terms of soil tilth, oxygen uptake and improved water retention, and creates a fertilizer having different release rates and times of release for various plant nutrients.

BEST MODE OF THE INVENTION

A. Acidification

First, the relative amounts of organic material, acid, and necessary water are preferably pre-determined. The ingredients are admixed in a preferably open container, and allowed to mix together for one to three minutes. Steam may be injected to wet the reacting components of the total mixture is less than 40% water by weight.

If the resulting material is to be added to alkaline soil, calcium carbonate can be added to the organic material of the first step. If the acid is totally consumed during the process, another acid such as nitric acid may be added to the admixture to neutralize any carbonate present. If the product is to be applied to an already alkaline soil, calcium and magnesium in the form of lime or dolomite may be added to the admixture of the first step, a reaction then occurs between the acid and bicarbonate ions found in the lime or dolomite, generating carbon dioxide. This reaction tends to produce an improved product if the resulting material is to be applied to alkaline soils since bicarbonate tends to tie-up trace elements when applied to alkaline soils.

Alternatively, for application to acidic soils, carbonates can be preserved by adding lime or dolomite to the admixture after increasing the pH of the admixture.

Either composted or non-composted organic materials may be used in the process. As used herein, "organic materials" include materials such as livestock and poultry manure, sewage sludge, cotton gin trash, cannery wastes, lawn clippings, food wastes, carbon from pyrolysis and cellulose. Some raw non-composted organic waste materials may contain as much as 80% water. Ionic reactions including acid-base reactions, has been found to occur best in a minimum 40–45% water environment. By selecting a mixture of high water organic wastes (up to 85% water in the case of sludge) and drier wastes such as mint straw (20% water), chicken manure (20–45% water), and dairy manure which can range from 20 to 75% water, it has been found that a minimum of 40–45% water level can be achieved. Steam provides the best method of adding a minimum of additional, water to promote the ionic reactions desired in the inventive process. Previous attempts of just adding additional water to promote these reactions, made the mixture much wetter, expensive to dry and impossible to extrude and form directly out of the reactor. Steam has been found essential to efficiently achieve the desired reaction and a continual batch process. Preferred materials are free of heavy metals and other toxic substances.

Steam, dry super heated steam, water, or a mixture thereof is used as the source of additional water in the process. Steam may be 5% of the total minimum water. Steam increases the reaction temperature, can melt frozen organic materials, provides a medium for salt formation in an acid-base reaction; scrubs off the gases emitted during the reaction, and apparently increases the efficiency of the chemical reactions. Super-heated steam boilers are available from Mechanical Services of Yakima, Wash.

Acids for use in the invention include sulfuric acid, nitric acid, hydrochloric acid, acetic acid, phosphoric acid, citric acid, and mixtures thereof. The amount of acid added will typically be equivalent to 5–12% or less of sulfuric acid (and preferably less than 10% by total weight 93% sulfuric acid).

B. Increasing the pH

Next, the pH is adjusted upwards (from 0.5–1.5 to 6.5–7.5) by adding a basic material such as anhydrous ammonium, or potassium hydroxide, while steam is simultaneously introduced (e.g. injected) into the mixture. This phase of the reaction takes place in 1 to 2 minutes. The admixture increases in temperature during this step. The steam, besides increasing the temperature of the admixture, acts to scrub of the gas emissions existing the reactor or mixer. For example, ammonia is absorbed by the steam incorporated into the admixture, and its release into the atmosphere is greatly diminished.

Steam also acts to provide free water immediately, evidently acting to enhance the reaction, and increases the temperature of the reactants which is of special assistance when the organic material to be treated is cold or frozen.

Also of importance, the steam helps provide free water throughout the acidified biomass to complete the following reaction:

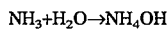

Then,

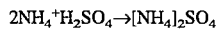

the common fertilizer ammonium sulfate.

The rapid pH change is believed to cause destruction of colloidal suspensions, freezing up bound water, which greatly aids in subsequent drying of the products, as well as the products disinfection. When the product is tested for humic acid, it is shown that nearly all humic acid molecules are destroyed. (e.g. less than 2% by weight humic acid remains)

The process in this regard should be of sufficient strength to provide for organic colloidal destruction in order to free-up bound water and destroy microorganisms.

C. Addition of Nutrients

After the acid-base reaction has been completed, dry sterile nutrients are preferably added to the admixture. Such nutrients are those used to balance out the soil to which the fertilizer will be applied. Typical nutrients in this regard include lime, dolomite, calcite, hydrobiotite, gypsum, rock phosphate, ammonium phosphate, potash, calcium peroxide, humic acid, ammonium nitrate, urea, trace minerals, or mixtures thereof.

Various soil clays of the medium and high water expansion types may also be added during this step. These soil clays include the 2:1 lattice crystals, such as vermiculite, that have an affinity for ammonia, potassium ions, magnesium ions, calcium ions, and other trace minerals. The clays may be pretreated, dried and then added with other dried minerals (e.g. bentonite).

Ground paper (e.g. newspaper) may be added to the mixture to decrease the overall moisture content.

D. Heating

The mixture after processing is preferably at a temperature of 72°–82° C. (160°–180° F.). At this time, the material is preferably about 30% moisture which is ideal for forming granules. The resulting admixture can also be pelletized or extruded depending upon desired form and moisture conditions. The granules are then heated to approximately 200° C. (400° F.). This step in the process typically lasts 10 to 15 minutes and reduces the moisture content of the material to 7–10% for ideal storage.

E. Constituent Ratios

Once produced, a preferred fertilizer according to the invention should have a complete and balanced formulation, being at the same time non-toxic while meeting the soil and the plant's needs for a growth cycle. This balance will depend on various factors such as the soil condition and content where the product is to be applied, the particular crop or vegetation to be grown, and the water requirements of the local area. A computer analysis (adapting a standard computer spread sheet program) contrasting soil condition with crop needs may be used in this regard. The invention thus also allows for the production of customized fertilizer.

The resulting products will typically contain 4–6% nitrogen, and a calcium to magnesium ratio of 6–15:1. Potassium, phosphorus, potash, calcium, magnesium, sulfur, and trace mineral ratios can be readily calculated. For sustained release, $NO_3$ releases first, followed by other nitrogen forms generated from the ammonia two weeks later. Then organic forms of nitrogen release in about a month due to bacterial degradation of the product. The clay particles will slowly release whatever nitrogenous compounds they contain over a period of time.

When sulfuric acid is the acid used in the process, a maximum of 10% sulfur (by weight) is used in the reaction, which will result in an end analysis of 3.4% sulfur (or 68 lbs. per ton of material), which is much closer to natural conditions than is that of the prior art.

While not intending to be bound by one theory of the invention, the following may help those of skill in the art to understand the results described herein.

By using an acid and a carbonate of calcium or magnesium: Acid+($CaCO_3$ or $MgCO_3$)→calcium or magnesium salt+$CO_2$. The release of carbon dioxide increases the surface area of the resulting particles. This increased surface area allows for greater exposure of the biomass at a reduced moisture content to the ionic environment resulting in a greater diffusion of the ions into the organic material.

The invention is further explained by the following illustrative EXAMPLES:

EXAMPLES

EXAMPLE I

Method of Production

In an open 2.2 cubic meter mixer, 580 kg (1280 lbs.) of uncomposted manure (60% water) were mixed with 45 kg sewage sludge (84% water), 372 kg mint straw (20% water), 45 kg waste paper (0% water) and 98 kg of H₂SO₄ (93%) for three minutes. Subsequently 31 kg of anhydrous ammonium was added to the admixture while, simultaneously 3% by total weight of steam was injected into the admixture. The basified admixture was allowed to mix for three minutes. At this time 22 kg of dolomite, 68 kg potash, 11 kg urea and 98 kg of rock phosphate were added to the mixture, and the components allowed to mix for several minutes. The admixture was then analyzed, and it showed nearly complete uptake of ammonia, with a *Strep fecalis* count of 17 MPN/100 grams, carbon to nitrogen was 17:1, and humic acid analysis showed 0.07% (California method of testing). After the addition of dry nutrients, the moisture content was 35%.

Afterwards, the material was passed to a meter box, then into a drum priller and finally a dryer. The material was then rolled into small granules (1 mm diameter). The drum then converts into a tube dryer where the granules were heated to 204° C. (400° F.). The product then exits the tube dryer, and passes through a rotating trammel screen where the particles were sorted by diameter. The fines were then passed through a gear extruder.

EXAMPLE II

A side-by-side growth comparison was done for vegetables comparing:

(A) commercially available chemical fertilizer (Ortho).

(B) the fertilizer produced by the process of Example I, sans calcium and magnesium; and (C) the fertilizer produced by the process of Example I (i.e. having 6% calcium and 1% magnesium).

The NPK of all three fertilizers were otherwise the same.

The soil was acidic and had good existing organic matter.

No significant difference could be seen between a variety of garden plants grown with the fertilizers of Example II.A. and Example II.B. However, the vegetables of Example II.C. exceeded those of Examples II.A. and II.B. in quantity in an amount varying from 20 to 35%. The plants treated with the product of Example II. C. were much more vigorous, and displayed increased stem strength, better nutrition, and disease resistance. This pattern was consistent throughout the plot testing.

EXAMPLE III—

Addition of Third Step

The process of Example I was repeated, except that the 22 kg of dolomite was added to the organic material of the first step (pre-acid addition), and a 2:1 crystal clay (i.e. vermiculite) was added to the reactor during the step wherein the nutrients were added.

The vermiculite was previously treated with super heated steam and anhydrous ammonia to impregnate the crystals with ammonium (5%). The product was dried, then added to the reaction mixture.

EXAMPLE IV

A similar test was run using dry, composted biomass. Water was added to bring the total moisture to 30% prior to injection of ammonia. No steam was injected. It was observed that the mixture did not retain the ammonia in an open air vessel with a nearly 50% loss of nitrogen in the final analysis. It was assumed that insufficient moisture and elevated temperature created conditions contrary to the facilitation of the reaction of water and ammonia to ammonium hydroxide, thus reducing the concentration of ammonium sulfate. Bacteria counts were $2.4 \times 10^6$ MPN/100 g indicating a lack of colloidal system destruction.

References herein to specific Examples or embodiments should not be interpreted as limitations to the invention's scope which is determined by the claims.

What is claimed is:

1. A method of treating organic material to form a final product comprising the steps of:

a first step of creating an admixture comprising admixing organic material with water and an acid, said acid equivalent to 5 to 12% by total weight 100% sulfuric acid;

a second step of creating a resulting admixture comprising increasing the pH of said admixture by adding a base, while simultaneously introducing steam into said admixture, the amount of said steam being up to 5% by weight; and a last step comprising heating and drying the resulting admixture into the final product.

2. The method according to claim 1, wherein the first step further comprises introducing steam into the admixture in an amount of up to 40% by weight of the final product.

3. The method according to claim 1, wherein the first step includes incorporating calcium carbonate to the admixture.

4. The method according to claim 1 further comprising a third step, after said second step, of adding a nutrient to the resulting admixture.

5. The method according to claim 4, wherein said nutrient is selected from the group consisting of lime, dolomite, calcite, hydrobiotite, gypsum, rock phosphate, potash, ammonium phosphate, urea, soil clays, calcium peroxide, ammonium nitrate, trace minerals, vermiculite, humic acid, and mixtures thereof.

6. The method of claim 1, wherein the organic material has not been previously composted.

7. The method according to claim 1, wherein said acid is selected from the group consisting of sulfuric acid, nitric acid, phosphoric acid, citric acid, acetic acid, and mixtures thereof.

8. The method according to claim 1, wherein said base is selected from the group consisting of potassium hydroxide, anhydrous ammonia and mixtures thereof.

9. The method according to claim 1, wherein the last step further comprises granulating the resulting admixture into the final product.

10. The method according to claim 9, wherein the final product is pelletized or extruded.

11. The method according to claim 3, wherein the calcium carbonate dolomite.

12. A fertilizer produced by the method of claim 11, wherein said fertilizer contains both calcium and magnesium in a weight ratio of calcium to magnesium of 6 to 15:1 respectively.

* * * * *

UNITED STATES PATENT AND TRADEMARK OFFICE
CERTIFICATE OF CORRECTION

PATENT NO. : 5,466,273
DATED : November 14, 1995
INVENTOR(S) : Larry V. Connell

It is certified that error appears in the above-indentified patent and that said Letters Patent is hereby corrected as shown below:

On the Title Page, col. 2, line 7, change "shouldn'3t" to --shouldn't--;

In col. 1, line 65, delete the period after "step" (1st occurrence) and reinsert the period after "step)";

In col. 2, line 2, delete the comma after "step" and reinsert the comma after "increase";

In col. 2, line 32, after "components" change "of" to --if--;

In col. 2, line 65, delete the comma after "additional";

In col. 3, line 30, change "to scrub" to --as a scrubber-- and "existing" to --exiting--;

In col. 3, line 45, change the equation to --$2NH_4^+ + H_2SO_4 \rightarrow [NH_4]_2SO_4$--

In col. 3, line 52, change "products" to --product's--;

In col. 3, line 54, delete the period after "destroyed";

In col. 3, line 55, insert a period after "remains)";

In col. 6, line 56, after "carbonate" insert --is--.

Signed and Sealed this

Seventh Day of July, 1998

Attest:

BRUCE LEHMAN

Attesting Officer

Commissioner of Patents and Trademarks